(12) United States Patent
Bertacchi

(10) Patent No.: US 6,625,461 B1
(45) Date of Patent: Sep. 23, 2003

(54) METHOD AND SYSTEM FOR PROVIDING COMPATIBILITY BETWEEN TELECOMMUNICATION NETWORKS USING DIFFERENT TRANSMISSION SIGNALING SYSTEMS

(75) Inventor: Luciano Bertacchi, Pierrefonds (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/539,369

(22) Filed: Mar. 31, 2000

(51) Int. Cl.[7] .................................................. H04Q 7/20
(52) U.S. Cl. ................. 455/466; 455/412.1; 455/412.2; 455/432.2
(58) Field of Search ................................. 455/466, 412, 455/413, 414, 426, 432, 445, 550, 560

(56) References Cited

U.S. PATENT DOCUMENTS

| | | | | |
|---|---|---|---|---|
| 5,878,397 A | * | 3/1999 | Stille et al. ................. | 455/466 |
| 5,903,726 A | * | 5/1999 | Donovan et al. ............ | 709/206 |
| 5,946,629 A | * | 8/1999 | Sawyer et al. .............. | 455/466 |
| 6,006,098 A | | 12/1999 | Rathnasabapathy et al. | 455/461 |
| 6,108,325 A | | 8/2000 | Stephanson et al. ........ | 370/337 |
| 6,108,559 A | * | 8/2000 | Astrom et al. .............. | 455/466 |
| 6,240,296 B1 | * | 5/2001 | Yu et al. ..................... | 455/466 |
| 6,298,232 B1 | * | 10/2001 | Marin et al. ................ | 455/413 |
| 6,308,075 B1 | * | 10/2001 | Irten et al. .................. | 455/466 |

FOREIGN PATENT DOCUMENTS

| | | |
|---|---|---|
| EP | 0 895 432 | 2/1999 |
| WO | WO 99/53698 | 10/1999 |

OTHER PUBLICATIONS

International Search Report, PCT/SE01/00667, dated Nov. 9, 2001.

* cited by examiner

Primary Examiner—Dwayne Bost
Assistant Examiner—Tsuleun R. Lei
(74) Attorney, Agent, or Firm—Jenkens & Gilchrist; Sandra Beauchesne

(57) ABSTRACT

A method and system for increasing compatibility among telecommunications networks using different types of signaling systems. Current location information for a mobile station is stored in a register. Subsequently, a telecommunication node attempting to access the mobile station requests current location data from the register. It is determined, however, that the stored location information is incompatible with a signaling system used by the telecommunication node. As a result, a physical address that corresponds to the stored location information is identified as being compatible with the signaling system. The identified physical address is then used to perform the access of the mobile station. In accordance with one embodiment of the invention, the attempted access of the mobile station is for purposes of delivering a short message service (SMS) message. In another embodiment, the attempted access comprises an attempt to set up an international call connection.

29 Claims, 4 Drawing Sheets

METHOD AND SYSTEM FOR PROVIDING COMPATIBILITY BETWEEN TELECOMMUNICATION NETWORKS USING DIFFERENT TRANSMISSION SIGNALING SYSTEMS

BACKGROUND OF THE INVENTION

1. Technical Field of the Invention

The present invention relates in general to message routing in mobile telecommunications systems, and in particular to the provision of addresses for use in different signaling systems.

2. Description of Related Art

Many cellular telephone networks support the transmission of short message service (SMS) messages between short message entities, including mobile stations and short message terminals. The purpose of a short message service is to provide a means for transferring textual messages between the short message entities using the communications environment provided by a cellular telephone network.

Generally, such short message service messages originate with or terminate at a subscriber mobile station. In particular, an SMS message is delivered from an originating short message entity to an SMS message center via a fixed telephone network and/or a cellular telephone network. The message center serves as a store and forward center for receiving and delivering SMS messages to a destination short message entity. Upon receiving an SMS message intended for the destination short message entity, the SMS message center attempts to forward the message to that entity. If the attempt fails, the SMS message center stores the message for subsequent delivery to the destination short message entity. The HLR will notify the SMS message center when the subscriber is again active (i.e., registered) in the network. At that time, the SMS message center can again attempt to deliver the SMS message to the destination short message entity. It would be preferable, however, if the SMS system were designed to provide reliable message delivery by decreasing the amount of failed delivery attempts.

During normal cellular operations, mobile stations periodically register with a visited mobile switching center (VMSC) that serves the area in which the mobile station is currently located. Using information contained in the registration signal, the VMSC notifies a home location register (HLR) associated with the subscriber mobile station of the mobile station's current location. The location information is stored in the HLR and can subsequently be used in any of a variety of circumstances in which the mobile station needs to be contacted, such as when a call directed to the mobile station is received by the cellular network.

Delivery of SMS messages is another situation in which the stored location of the mobile station is used. When an SMS message center receives an SMS message to deliver to a cellular subscriber, it must request the SMS address of the destination cellular subscriber from the HLR associated with the subscriber. Once the HLR provides the SMS address, the message center uses the received SMS address for routing the message to the mobile station.

In some cases, however, the SMS message center can not recognize the format of the SMS address provided by the HLR. In particular, in current systems, the SMS address type or format that is provided by the HLR matches the type of signaling system used for communications between the VMSC and the HLR. This signaling system is not necessarily the same as, or compatible with, the signaling system used by the message center for delivery of the SMS message. If these signaling systems, or their respective SMS address types, are incompatible, the message center can not deliver the message.

Similarly, for international roaming operations (i.e., when a mobile station registers in a country other than the country in which the mobile station's HLR is located), the foreign cellular network might use a signaling system that is not compatible with the signaling system used in the mobile station's home country. Such an incompatibility might prevent communications between cellular telecommunication nodes in the home country and in the foreign country. For example, the VMSC in the foreign country might not be able to route messages to the gateway MSC (GMSC) in the mobile station's home country.

There is a need, therefore, for a method and system for facilitating communications between networks, or nodes within a network, that use different address types or formats or different signaling systems. Such a method and system would decrease the potential for failed communication attempts and would avoid the subscriber inconvenience caused by such failed communications attempts. Furthermore, such a method and system would increase the attractiveness of the SMS feature and would expand the territory in which cellular subscribers can use their mobile telephones.

SUMMARY OF THE INVENTION

The present invention comprises a method and system for providing access to a mobile station in a telecommunications system that includes networks that use incompatible common channel signaling systems. In accordance with the invention, an address for a serving mobile telecommunication node where the mobile station is currently located is provided to an originating telecommunication node from which an access to the mobile station is attempted.

In accordance with one embodiment of the present invention, current location data for the mobile station is stored in a database. Subsequently, a request for an address for use in delivering a short message service (SMS) message is received. It is determined, however, that the stored location data for the mobile station is incompatible with a signaling system to be used for delivering the SMS message. Accordingly, a physical address that corresponds to the current location data and that is compatible with the signaling system is identified and is used for delivering the SMS message via the signaling system.

In accordance with another embodiment of the invention, a mobile station registers with a serving telecommunication node, which sends location data for the mobile station to a database associated with the mobile station. The location data is transmitted via a first signaling system and is stored in the database. Subsequently, a request for a current location of the mobile station is received from a telecommunication node that is attempting to access the mobile station.

In one embodiment of the invention, the attempted access involves an attempt to deliver an SMS message using a second signaling system, wherein addresses that are compatible with the first signaling system are not compatible with the second signaling system. In response to the request for the current location, at least a portion of the stored location data is retrieved from the database for use in connection with the attempt to deliver the SMS message to the mobile station. Because the SMS message is to be delivered using the second signaling system, however, a physical address that is compatible with the second signaling system needs to be identified. Once such a physical address is identified, the SMS message can be delivered using that physical address by transmitting the SMS message via the second signaling system.

In another embodiment of the invention, the attempted access involves an attempt to set up an international call connection from the telecommunication node that is attempting to set up the call connection to the mobile station. In this case, it is assumed that the originating telecommunication node uses a second signaling system for transmitting signaling messages. In response to the request for the current location, at least a portion of the stored location data is retrieved from the database for use in connection with subsequent messaging towards the destination. Because the originating telecommunication node uses the second signaling system, however, a physical destination address that is compatible with the second signaling system needs to be identified. Once such a physical address is identified, the physical address is delivered to the originating telecommunication node, and subsequent cellular protocol messages are transmitted via the second signaling system using the identified physical address.

In yet another embodiment of the invention, the serving mobile telecommunications node receives a physical address for the originating telecommunications node that is compatible with the second signaling system, which is used by the originating telecommunications node. Because the serving mobile telecommunications node uses the first signaling system, however, a physical destination address that is compatible with the first signaling system needs to be identified so that the serving mobile telecommunications node can communicate with the originating telecommunications node. The identified physical address is used by the serving mobile telecommunications node for transmitting subsequent cellular protocol messages to the serving telecommunications node via the first signaling system.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
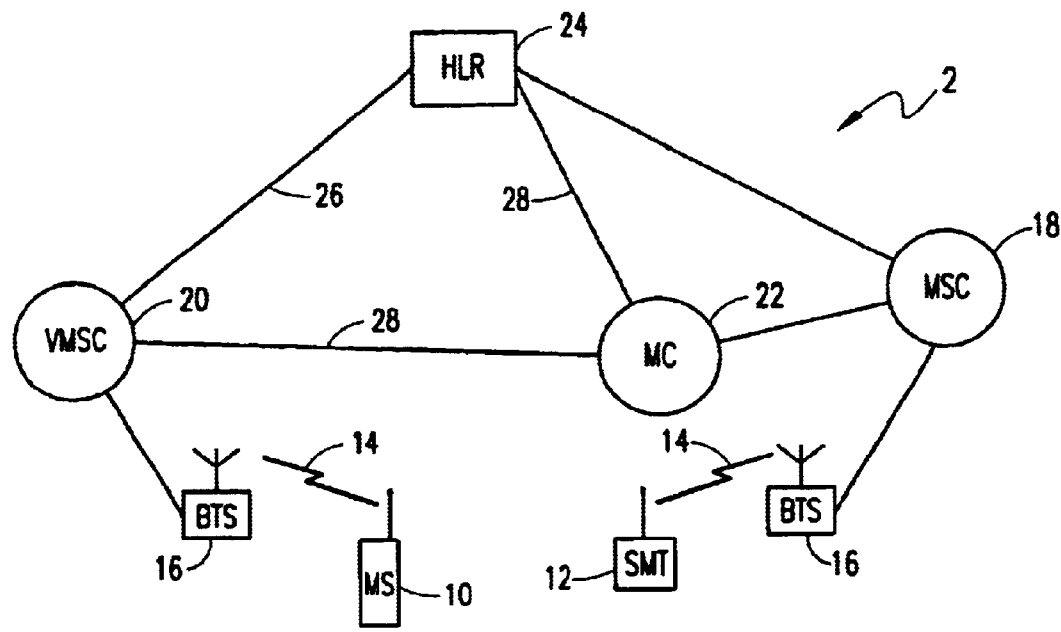
FIG. 1 is a block diagram of a portion of a cellular telecommunications network that includes a short message service (SMS) feature and that can be used in connection with the present invention.

Reference is now made to the Drawings wherein like reference characters denote like or similar parts throughout the various Figures. Referring now to FIG. 1, there is illustrated a block diagram of a portion of a cellular telecommunications network 2 that includes a short message service (SMS) feature and that can be used in connection with the present invention. The SMS feature provides a means for transferring textual messages between short message entities. In this example, the short message entities include a mobile station (MS) 10 and a short message terminal (SMT) 12 that are each capable of communicating with the cellular network 2 via air interfaces 14. Signals are transmitted and received over the air interfaces 14 by base transceiver stations (BTSS) 16. Each base transceiver station 16 is associated with and controlled by a mobile switching center, through which the base transceiver station 16 is connected to the cellular network 2.

In this case, the short message terminal 12 is in an area served by a mobile switching center (MSC) 18, and the mobile station 10 is roaming in an area served by a visited mobile switching center (VMSC) 20. When an SMS message destined for the mobile station 10 is transmitted by the short message terminal 12, the MSC 18 forwards the message to a message center (MC) 22 associated with the mobile station 10. Upon receiving the message, the message center contacts a home location register (HLR) 24 associated with the mobile station 10 to request a current location of the mobile station 10.

In the cellular network 2, the HLR 24 serves to store information about the mobile station 10, including subscriber profile data as well as data indicating the latest known location for the mobile station 10. The location information in the HLR 24 is updated, in accordance with ordinary cellular operations, each time the mobile station 10 registers in a new territory. In particular, as the subscriber roams, the subscriber's mobile station 10 periodically registers with, or informs, the VMSC 20 for that area of the mobile station's presence in the area. The VMSC 20 then notifies the HLR 24 that is associated with the mobile station 10 of the mobile station's location using a logical location identifier, such as an MSCID, and optionally a physical address for the VMSC 20.

Generally, when a node in the cellular network 2 attempts to access the subscriber's mobile station 10, the node needs to know the current location of the subscriber (i.e., the MSC where the subscriber can be reached). Accordingly, such a node requests location information from the HLR 24, which provides the MSCID for the MSC in which the mobile station 10 most recently registered. This MSCID can then be used by the requesting node to subsequently access the destination VMSC 20. For cellular operations that use IS-41 or some similar communication protocol, the signaling system used to transport these location messages becomes transparent (i.e., it is irrelevant). This is because the MSCID is not used for addressing or routing purposes. Instead, the MSCID is merely used to identify nodes within the applicable cellular protocol. The node that receives the MSCID translates the MSCID into an appropriate physical address for routing subsequent messages to the VMSC 20.

For SMS operations, on the other hand, the signaling system used to transport or transmit the location messages is not transparent because current SMS standards require that the HLR 24 provide the SMS message center 22 with a physical address (as opposed to the logical location) for the VMSC 20. In other words, SMS systems do not operate using logical location identifiers, such as the MSCID; instead, they use physical addresses that are intimately tied to, or compatible with, the particular signaling system used between the origination and destination nodes. In the Open Systems Interconnection (OSI) model, for example, the physical address resides in the Signaling Connection Control Part (SCCP) layer, which corresponds to layer 4 of the OSI model, and in the Message Transfer Part (MTP) layer, which corresponds to layer 3 of the OSI model. In particular, the physical address includes a signaling point code (SPC) and Subsystem Number (SSN) at the SCCP layer and a origination point code (OPC) and/or destination point code (DPC) at the MTP layer. The MSCID, on the other hand, resides at the application layer, which corresponds to layer 7 of the OSI model.

In response to the request from the SMS message center 22, the HLR 24 returns the physical address of the VMSC 20 at which the mobile station 10 last registered. The physical address that is provided by the HLR 24 is compatible with the particular common channel signaling system used to send the registration information from the VMSC 20 to the HLR 24. The common channel signaling system, for example, might be Signaling System 7 (e.g., ANSI-SS7), ITU-CC7, TCP/IP or some other packet-switching protocol, or X.25, all of which use mutually incompatible physical addressing schemes. Under current SMS standards, it is assumed that the physical address provided by the HLR 24 will also be compatible with the signaling system used by the message center 22. In North America, for instance, ANSI-SS7 will typically be used by the VMSC 20, the SMS message center 22, and the HLR 24.

In some cases, however, the message center's signaling system is different than the signaling system used between the VMSC 20 and the HLR 24. For example, in South America and in many Asian and Pacific countries, the VMSC 20 uses ITU-CC7. In such a case, if the physical address provided to an ANSI-SS7 message center 22 is an ITU-CC7 physical address, the message center 22 will not be able to deliver the message to the mobile station 10 because it will not recognize the physical address provided by the HLR 24.

In accordance with the present invention, the physical destination address that is provided to the message center 22 needs to be compatible with the signaling system that will be used to deliver the message to the destination. In one embodiment of the invention, the HLR 24 converts the physical address received from the VMSC 20 at registration into a physical address that is compatible with the signaling system used by the message center 22, based on an identification of which message center 22 is requesting the addressing information and on knowledge at the HLR 24 of the type of signaling system used by that message center 22. In a second embodiment of the invention, the HLR 24 converts the MSCID or other logical location received from the VMSC 20 at registration into a physical address that is compatible with the signaling system used by the message center 22, again based on an identification of which message center 22 is requesting the addressing information and on knowledge at the HLR 24 of the type of signaling system used by that message center 22.

In accordance with another embodiment of the invention, the VMSC 20 sends two or more physical addresses to the HLR 24 with the registration information. Alternatively, the VMSC 20 can send all of the physical addresses that could possibly be used by the SMS system. The HLR 24 can then forward all of the received physical addresses to the message center 22 or can select the physical address that is compatible with the signaling system used by the message center 22.

In accordance with another embodiment of the invention, the VMSC 20 can analyze a mobile station identifier (such as the MIN or IMSI for the mobile station), received during the registration process, to identify the type of signaling system used by the SMS system associated with the mobile station 10. The VMSC 20 can then send to the HLR 24 the physical address that is used by the SMS system. In accordance with yet another embodiment of the invention, the HLR 24 can send the MSCID, or the physical address received from the VMSC 20, to the message center 22, and the message center 22 can convert the MSCID, or the physical address, into the physical address that is compatible with the signaling system used by the message center 22 using a conversion table stored at the message center 22.

Figure 2:
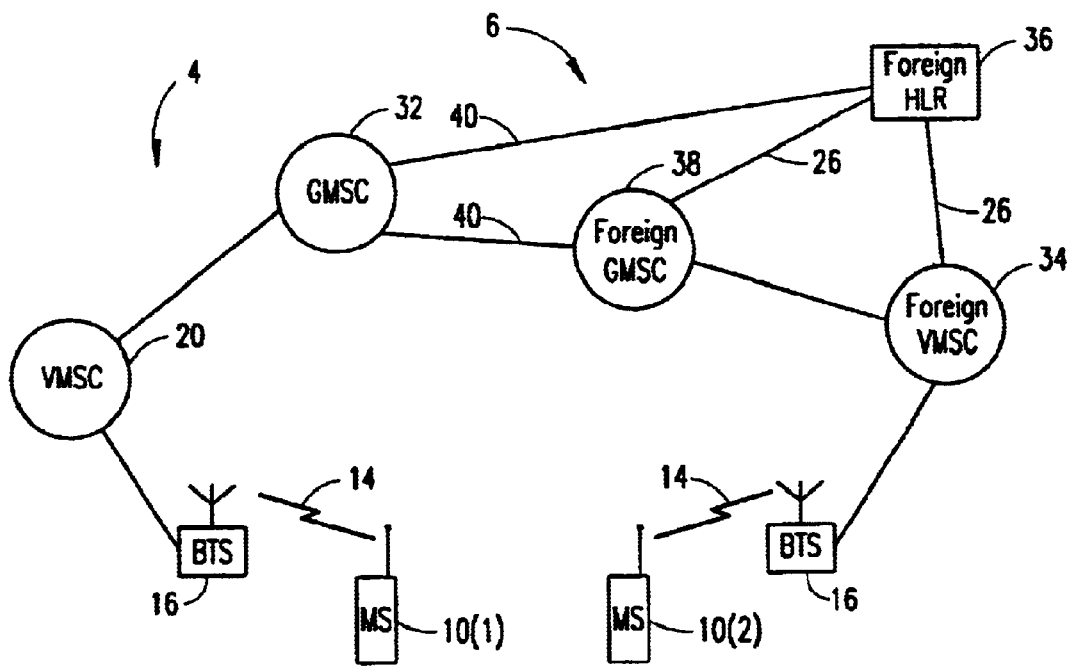
FIG. 2 is a block diagram of portions of interconnected cellular telecommunications networks that are located in different countries and that can be used in connection with another embodiment of the present invention.

Referring now to FIG. 2, there is illustrated a block diagram of portions of interconnected cellular telecommunications networks 4 and 6 that are located in different countries and that can be used in connection with another embodiment of the present invention. In a domestic cellular network 4, a first mobile station 10(1) communicates with a domestic VMSC 20 via an air interface 14 and a base transceiver station 16. In a foreign cellular network 6, a second mobile station 10(2) communicates with a foreign VMSC 34 via an air interface 14 and a base transceiver station 16. To engage in international communications between mobile stations 10 in different countries, the voice connection must be routed through a domestic gateway MSC (GMSC) 32, across an international signaling connection 40, and through a foreign GMSC 38.

When the first mobile station 10(1) places a call to the second mobile station 10(2), the domestic VMSC 20 or GMSC 32 contacts, via an international signaling connection 40, a foreign HLR 36 associated with the second mobile station 10(2) to request current location information. This request includes the domestic VMSC's or GMSC's originating MSCID and physical address. In response, the foreign HLR 36 returns a terminating MSCID and a physical address for the foreign VMSC 34 where the second mobile station 10(2) most recently registered. In some cases, however, the domestic and foreign VMSCs 20 and 34 or GMSCs 32 and 38 might not recognize the received (originating or terminating) MSCIDs. In addition, the domestic or foreign cellular system 4 or 6 might use a signaling system that is not compatible with the received physical addresses. As a result, the domestic or foreign VMSCs 20 or 34 or GMSCs 32 or 38 would not be able to communicate with the foreign or domestic VMSCs 34 or 20 for subsequent direct cellular (e.g., IS-41) signaling (required for coordination and processing of subscriber services).

In accordance with another embodiment of the present invention, the foreign HLR 36 can translate the second mobile station location information into a physical address that is compatible with the signaling system used by the domestic cellular system 4. Alternatively, the foreign VMSC 34 can provide the foreign HLR 36 with two or more physical addresses, which can then be forwarded by the foreign HLR 36 to the domestic cellular network 4 so that it has access to a particular type of physical address that is compatible with the domestic cellular network's signaling system.

In addition, as mentioned above, the initial request from the domestic VMSC 20 or GMSC 32 includes the domestic VMSC's or GMSC's originating MSCID and physical address. In some cases, the nodes in the foreign cellular network 6 might not recognize the received originating MSCID or physical address. In accordance with another embodiment of the invention, the domestic VMSC 20 or GMSC 32 can translate the received MSCID or physical address into a physical address compatible with the signaling system used by the foreign cellular network 6. The foreign HLR can also translate the originating MSCID into a physical address that is compatible with the signaling system used by the foreign VMSC 34. Alternatively, the domestic VMSC 20 or GMSC 32 can provide the foreign cellular network 6 with two or more physical addresses that are compatible with the foreign cellular network's signaling system.

Figure 3:
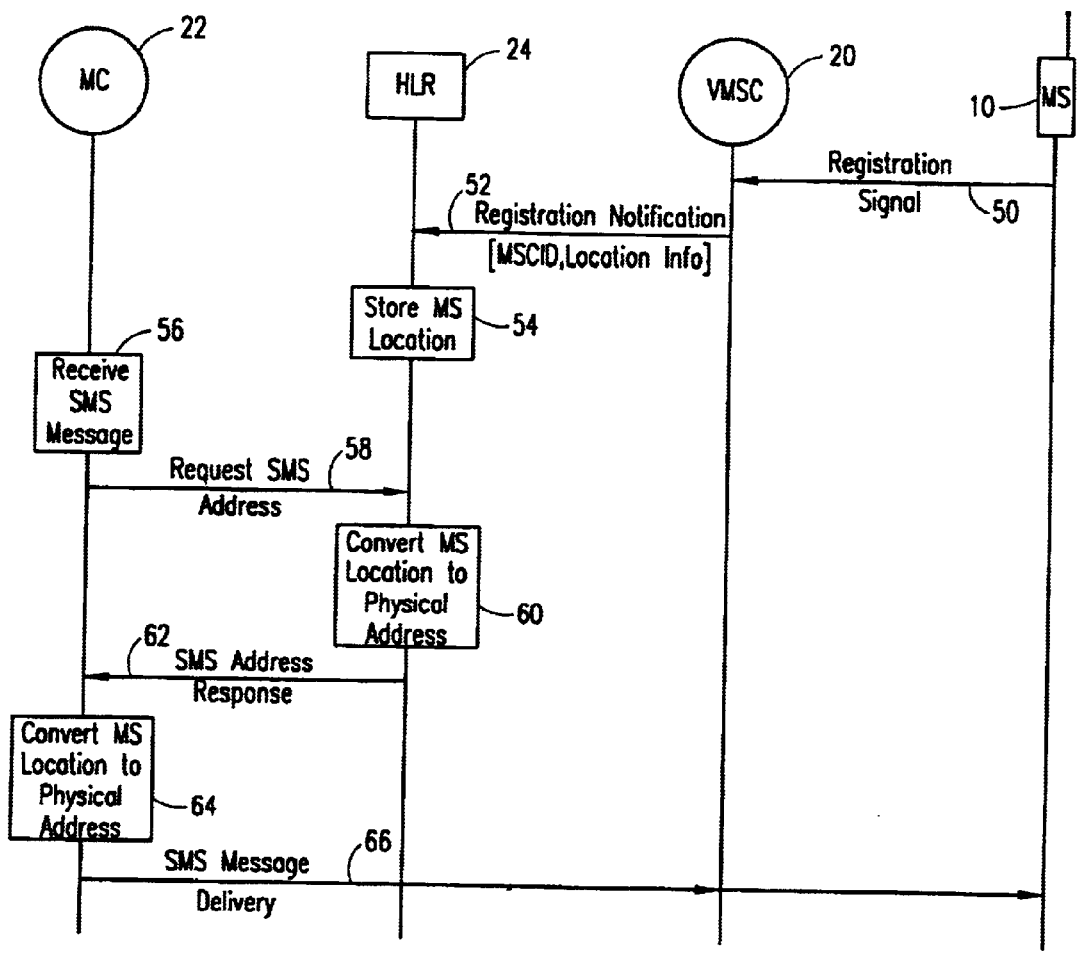
FIG. 3 is a message flow and signaling diagram illustrating an SMS message delivery in accordance with the present invention.

In FIG. 3, there is shown a message flow and signaling diagram illustrating an SMS message delivery in accordance with the present invention. Referring now to FIGS. 1 and 3, when a mobile station 10 first enters a service area that is served by a VMSC 20, the mobile station 10 sends a registration signal 50 over an air interface 14 and via a base transceiver station 16 to the VMSC 20. The VMSC 20 analyzes a mobile station identifier or other data contained in the registration signal 50 to identify the HLR 24 associated with the mobile station 10. The VMSC 20 then notifies the HLR 24 of the mobile station registration by sending a "Registration Notification" message 52 to the HLR 24 via an IS-41 signaling connection 26. The "Registration Notification" message 52 includes a parameter containing an MSCID for the VMSC 20 and may include one other parameter containing physical location data for the VMSC 20. The HLR 24 stores the received MSCID and other location data in memory at step 54.

Subsequently, a short message terminal 12 sends an SMS message over an air interface 14 and via a base transceiver station 16 to an MSC 18 for the area in which the short message terminal 12 is located. The SMS message includes addressing information for the intended destination short message entity (the mobile station 10, in this case). Based on the addressing information, the MSC 18 identifies a message center 22 associated with the mobile station 10 and forwards the SMS message to the message center 22. Accordingly, the message center 22 receives the SMS message at step 56.

Before delivering the SMS message, the message center 22 must know where the destination mobile station 10 is located. Thus, the message center 22 sends a request 58 for the SMS address (i.e., the physical address of the VMSC 20) to the HLR 24 via an SMS signaling connection 28. In this case, it is assumed that the VMSC 20 uses a different signaling system (towards HLR) than the SMS message center 22. For example, the IS-41 signaling connection 26 between the VMSC 20 and the HLR 24 might be an ITU-CC7 connection, while the SMS signaling connections 28 used by the message center 22 might be ANSI-SS7 connections. Thus, the physical location data provided by the VMSC in the "Registration Notification" message 52, or translated by the HLR from the MSCID, cannot be used by the message center 22 to route the SMS message. In accordance with existing standards, however, the HLR 24 provides the message center 22 with the physical address that is received from the VMSC 20 or that is translated from the MSCID because the standard assumes that the signaling systems used throughout the overall system 2 are the same. Because of this assumption, the message center 22 in this case would not be able to decipher the physical address provided by the HLR 24 and would therefore not be able to deliver the message.

In accordance with one embodiment of the present invention, however, the HLR 24 converts the stored location information into an SMS address that is used by the SMS message center 22 at step 60. This conversion can include converting the stored MSCID into an appropriate physical address or converting the stored physical location data into an appropriate physical address. In addition, the conversion can be accomplished using a table stored at the HLR 24 that lists, for example, MSCIDs or ITU-CC7 addresses and their corresponding ANSI-SS7 addresses. The appropriate physical address for use by the message center 22 can be determined according to the signaling system on which the SMS address request 58 is received or according to information stored at the HLR 24 that identifies the type of signaling system used by the message center 22.

As a result, the HLR 24 sends an SMS address response message 62 to the message center 22 containing the appropriate physical address. The message center 22 can then use the received physical address to perform an SMS message delivery 66 to the VMSC 20 via an SMS signaling connection 28. The VMSC 20, in turn, forwards the message to the destination mobile station 10.

In accordance with another embodiment of the invention, the VMSC 20 includes more than one physical address in the "Registration Notification" message 52. In particular, the VMSC 20 sends the physical address that is compatible with the signaling system used by the VMSC 20 and also at least one physical address that is compatible with at least one other type of signaling system. For example, the "Registration Notification" message 52 can include parameters for including a primary destination point code, which is used for sending a physical address compatible with the VMSC's signaling system, and a secondary destination point code, which is used for sending a physical address compatible with an alternative signaling system. Alternatively, the "Registration Notification" message 52 can include all possible physical addresses that can be used by SMS message centers 22.

Then, instead of converting the MSCID or stored physical address into an appropriate physical address at step 60, the HLR 24 can provide one or more of the physical addresses received from the VMSC 20. In particular, the SMS address response message 62 can include all of the received physical addresses in which case the message center 22 selects the appropriate physical address from the list of received physical addresses, or the HLR 24 can send only the appropriate physical address based on which message center 22 is requesting the location information.

In another embodiment of the invention, it is assumed that the HLR 24 stores the MSCID and any other physical location information received from the VMSC 20. Then, in response to the SMS address request message 58, the HLR 24 provides the stored MSCID and/or any other stored location information as part of the SMS address response message 62; in other words, the HLR 24 does not perform a conversion to an appropriate physical address. Instead, the message center 22, upon receiving this data, converts the MSCID or physical location information into a physical address that is compatible with the signaling system used by the message center 22. This conversion can be accomplished using a table stored at the message center 22 that contains a list of MSCIDs or other physical location information and a corresponding physical address for the VMSC 20 that is compatible with the signaling system used by the message center 22.

Figure 4:
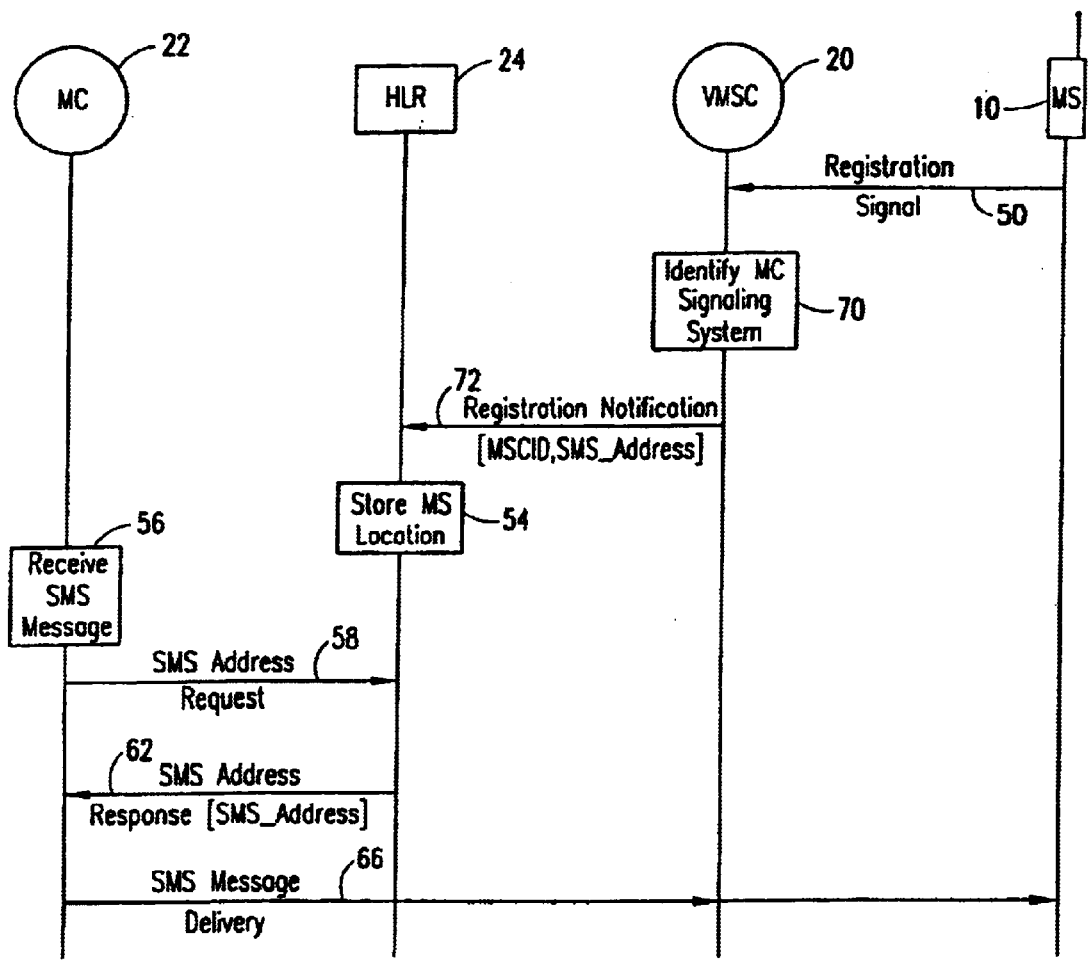
FIG. 4 is a message flow and signaling diagram illustrating an SMS message delivery in accordance with an alternative embodiment of the present invention.

Reference is now made to FIG. 1 in connection with FIG. 4, which shows a message flow and signaling diagram illustrating an SMS message delivery in accordance with an alternative embodiment of the present invention. When a mobile station 10 first enters a service area that is served by a VMSC 20, the mobile station 10 sends a registration signal 50 over an air interface 14 and via a base transceiver station 16 to the VMSC 20. Then, at step 70, the VMSC 20 analyzes information contained in the registration signal 50 to identify the message center 22 that is associated with the mobile station 10. The registration signal 50 includes a mobile identification number (MIN), or some other identifier such as the international mobile station identifier (IMSI), for the mobile station 10. Generally, the VMSC 20 must recognize the MIN series to know which HLR 24 to contact for purposes of registration. In other words, a particular series of MINs is associated with a specific HLR 24 (each mobile station 10 has only one MIN and is associated with only one HLR 24). Using knowledge of this fact, the VMSC 20 can determine the HLR 24 with which the roaming mobile station 10 is associated.

Likewise, a similar procedure can be used to identify the message center 22 with which the mobile station 10 is associated. As with the HLR 24, each mobile station 10 is associated with only one SMS message center 22. Typically, the mobile station's MIN can be analyzed to identify the associated message center 22 based on the MIN series of the mobile station's MIN. By storing data identifying the type of signaling system used by all possible message centers 22 at the VMSC 20, the VMSC 20 can then easily determine which type of physical address should be used. As an additional alternative, the registration signal 50 can also include a physical address of the message center 22, which is stored in the mobile station 10 for purposes of being able to send SMS messages. The VMSC 20 can analyze the physical address of the message center 22 at step 70 to determine which type of signaling system is used by the message center 22.

The VMSC 20 then notifies the HLR 24 of the mobile station registration by sending a "Registration Notification" message 72 to the HLR 24 via an IS-41 signaling connection 26. The "Registration Notification" message 72 in this case includes a parameter containing an MSCID for the VMSC 20 and an appropriate SMS address, which corresponds to and is compatible with the identified type of signaling system used by the message center 22. The HLR 24 stores the received MSCID and other location data in memory at step 54.

Subsequently, a short message terminal 12 sends an SMS message over an air interface 14 and via a base transceiver station 16 to an MSC 18 for the area in which the short message terminal 12 is located. The SMS message includes addressing information for the intended destination short message entity (the mobile station 10, in this case) Based on the addressing information, the MSC 18 identifies a message center 22 associated with the mobile station 10 and forwards the SMS message to the message center 22. Accordingly, the message center 22 receives the SMS message at step 56.

As a result, the message center 22 sends a request 58 for the SMS address to the HLR 24 via an SMS signaling connection 28. In response, the HLR 24 sends an SMS address response message 62 to the message center 22 containing the appropriate stored SMS address, as previously identified by the VMSC 20 at step 70. The message center 22 can then use the received SMS address to perform an SMS message delivery 66 to the VMSC 20 via an SMS signaling connection 28. The VMSC 20, in turn, forwards the message to the destination mobile station 10.

Figure 5:
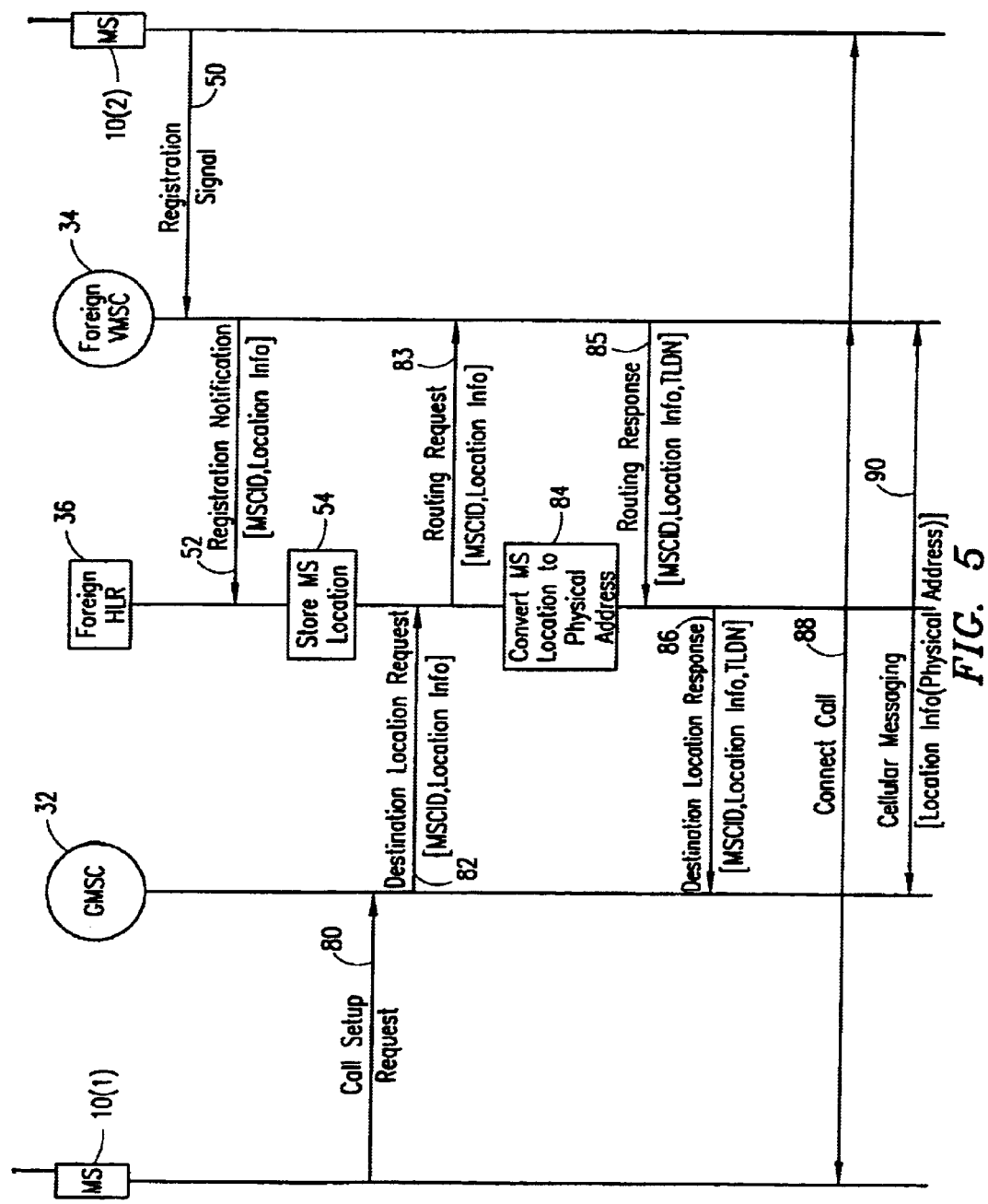
FIG. 5 is a message flow and signaling diagram illustrating an international call connection procedure between a first mobile station in a domestic cellular network and a second mobile station in a foreign cellular network in accordance with another embodiment of the present invention.

Reference is now made to FIG. 2 in connection with FIG. 5, which shows a message flow and signaling diagram illustrating an international call connection procedure between a first mobile station 10(1) in a domestic cellular network 4 and a second mobile station 10(2) in a foreign cellular network 6 in accordance with another embodiment of the present invention. When the second mobile station 10(2) first enters a service area that is served by a foreign VMSC 34, the second mobile station 10(2) sends a registration signal 50 over an air interface 14 and via a base transceiver station 16 to the foreign VMSC 34. The foreign VMSC 34 analyzes a mobile station identifier or other data from the registration signal 50 to identify the foreign HLR 36 associated with the second mobile station 10(2). The foreign VMSC 34 then notifies the foreign HLR 36 of the mobile station registration by sending a "Registration Notification" message 52 to the foreign HLR 36 via an IS-41 signaling connection 26. The "Registration Notification" message 52 includes a parameter containing an MSCID for the foreign VMSC 34 and at least one other parameter containing physical location data. The foreign HLR 36 stores the received MSCID and other location data in memory at step 54.

Subsequently, the first mobile station 10(1) sends a call setup request 80 to a domestic GMSC 32 via an air interface 14, a base transceiver station 16, and a domestic VMSC 20 that serves the area in which the first mobile station 10(1) is currently located. The call setup request 80 includes addressing information (MIN or IMSI) for the intended destination terminal (the second mobile station 10(2), in this case). Based on the addressing information, the domestic GMSC 32 identifies a foreign HLR 36 associated with the second mobile station 10(2) and sends a location request 82 to the foreign HLR 36 via an international signaling connection 40 to request current location information for the second mobile station 10(2) The location request 82 includes a parameter containing an MSCID for the GMSC 32 and at least one other parameter containing physical location data for the GMSC 32. The foreign HLR 36 forwards this information to the foreign VMSC 34 as part of a Routing Request message 83.

In accordance with one embodiment of the present invention, the foreign HLR 36 converts the stored location information of the VMSC 34 into a physical address that is used by the domestic cellular network 4 at step 84. This conversion can include converting the stored MSCID of the VMSC 34 into an appropriate physical address or converting the stored physical location data into an appropriate physical address. In addition, the conversion can be accomplished using a table stored at the foreign HLR 36 that lists, for example, MSCIDs or ITU-CC7 addresses and their corresponding ANSI-SS7 addresses. The appropriate physical address for use by the domestic cellular network 4 can be determined according to the signaling system on which the location request 82 is received or according to information stored at the foreign HLR 36 that identifies the type of signaling system used by the domestic cellular network 4. Preferably, such a conversion is also made by the GMSC 32 of its own MSCID before sending, and for inclusion in, the location request 82. As a result, the Location Info parameter includes a physical address that is used by the foreign cellular network 6.

In response to the Routing Request message 83, the foreign VMSC 34 sends a Routing Response message 85, which includes a parameter containing an (updated) MSCID for the foreign VMSC 34, at least one other parameter containing (updated) physical location data for the foreign VMSC 34, and a temporary local directory number (TLDN) for the second mobile station 10(2). The foreign HLR 36 then sends a location response message 86 containing the MSCID of the VMSC, the appropriate physical address, and the TLDN to the domestic GMSC 32. The domestic GMSC 32 can then use the received physical address to contact the foreign VMSC 34, where the second mobile station 10(2) is currently located, via an international signaling connection 40 and a foreign GMSC 38. Accordingly, a call connection 88 can be established between the first mobile station 10(1) and the second mobile station 10(2). In particular, the GMSC 32 routes the call based on B-number analysis of the TLDN provided by the foreign VMSC 34 via the foreign HLR 36. In addition, any subsequent cellular messaging 90 (such as a Redirection Request or Redirection Directive) are routed directly between the GMSC 32 and the foreign VMSC 34 using the appropriate physical addresses.

In an alternative embodiment, instead of converting the stored location information for the second mobile station 10(2) into an appropriate physical address at step 84, the "Registration Notification" message 52 can include two or more physical addresses that are each compatible with different signaling systems. If each of the received physical addresses are stored in the foreign HLR 36 at step 54, the foreign HLR 36 can identify the appropriate physical address to be sent to the domestic GMSC 32 in the location response message 86. Alternatively, all of the stored physical addresses can be sent to the domestic GMSC 32 in the location response message 86, and the domestic GMSC 32 can select the appropriate physical address based on the signaling system used by the domestic cellular network 4.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for providing access to a mobile station in a telecommunications system for delivery of a short message service (SMS) message, comprising the steps of:

registering a mobile station with a serving mobile telecommunications switching node, said serving mobile telecommunications switching node using a first common channel signaling system for transmission of signaling messages and having associated therewith a first physical address, wherein said first physical address is compatible with the first common channel signaling system;

transmitting location data for the mobile station to a database associated with the mobile station, said location data transmitted using the first common channel signaling system;

storing the location data in the database;

receiving a request for current location information for the mobile station, said current location information requested for purposes of delivering an SMS message to the mobile station, wherein delivery of SMS messages includes using a second common channel signaling system for transmission of SMS messages;

retrieving at least a portion of the stored location data in response to the request for current location information, said retrieved portion of the stored location data for use in connection with an attempt to deliver the SMS message to the mobile station;

identifying a second physical address for the mobile telecommunications switching node, said second physical address compatible with the second common channel signaling system and incompatible with the first common channel signaling system; and routing the SMS message to the serving mobile telecommunications switching node in accordance with the second physical address using the second common channel signaling system, the SMS message routed to the serving mobile telecommunications switching node for delivery of the SMS message to the mobile station.

2. The method of claim 1, wherein the step of identifying the second physical address for the mobile telecommunications switching node includes translating the retrieved portion of the stored location data into the second physical address.

3. The method of claim 2, wherein the retrieved portion of the stored location data includes the first physical address of the mobile telecommunications switching node.

4. The method of claim 2, wherein the retrieved portion of the stored location data includes a logical identifier of the mobile telecommunications switching node.

5. The method of claim 1, wherein the location data includes the second physical address.

6. The method of claim 5, wherein the location data further includes the first physical address.

7. The method of claim 5, wherein the step of registering the mobile station with the serving mobile telecommunications switching node includes sending data relating to the mobile station, and the step of identifying the second physical address for the mobile telecommunications switching node includes analyzing the data relating to the mobile station to determine which one of a plurality of common channel signaling systems is used during delivery of SMS messages.

8. The method of claim 7, wherein the data relating to the mobile station includes a mobile station identifier, said mobile station identifier analyzed to determine the common channel signaling system used during delivery of SMS messages.

9. The method of claim 7, wherein the data relating to the mobile station includes a data identifying an SMS node associated with the mobile station, said data identifying the SMS node analyzed to determine the common channel signaling system used during delivery of SMS messages.

10. The method of claim 1, wherein the step of identifying the second physical address for the mobile telecommunications switching node includes identifying a common channel signaling system used to send the request for current location information for the mobile station, said common channel signaling system used to send the request for current location information for the mobile station comprising the second common channel signaling system.

11. The method of claim 1, wherein the first common channel signaling system is selected from the group consisting of ITU-CC7 and ANSI SS7.

12. The method of claim 1, wherein the second common channel signaling system is selected from the group consisting of Signaling System 7 and ITU-CC7.

13. A telecommunications system, comprising:

a register associated with a mobile station, said register storing information relating to a current location of the mobile station;

a serving telecommunications node serving an area in which the mobile station is currently located, said serving telecommunications node notifying the register of a presence of the mobile station in the area by sending a location data message to the register using a first common channel signaling system, wherein said serving telecommunications node has associated therewith a first physical address compatible with the first common channel signaling system;

a short message service (SMS) message center for routing SMS messages, said SMS message center requesting and receiving from the register current location information derived from the information stored in the register, said current location information for use in delivering an SMS message to the mobile station, wherein said SMS message center routes the SMS message to the serving telecommunications node for delivery to the mobile station using a second common channel signaling system, said routing performed in accordance with a second physical address for the serving telecommunications node; and wherein the second physical address is identified as having a format compatible with the second common channel signaling system, the second physical address having a format incompatible with the first common channel signaling system.

14. The system of claim 13, wherein the register further converts location data included in the location data message into the second physical address, the current location information sent to the SMS message center including the second physical address.

15. The system of claim 13, wherein the location data message includes a plurality of physical addresses for the serving telecommunications node, wherein at least one of the plurality of physical addresses comprises the second physical address.

16. The system of claim 13, wherein the serving telecommunications node receives a registration signal from the mobile station and analyzes data included in the registration signal to determine that the SMS message center uses the second common channel signaling system, the serving telecommunications node including the second physical address in the location data message as a result of said determination.

17. The system of claim 13, wherein the SMS message center converts the received current location information into the second physical address.

18. The system of claim 13, wherein the second common channel signaling system is selected from the group consisting of Signaling System 7 and ITU-CC7.

19. The system of claim 18, wherein the first common channel signaling system is selected from the group consisting of ANSI-SS7 and ITU-CC7.

20. A method for providing an access to a mobile station in a telecommunications system, said telecommunications system including a plurality of networks that use different common channel signaling systems, comprising the steps of:

registering a mobile station with a serving mobile telecommunications switching node, said serving mobile telecommunications switching node using a first common channel signaling system for transmission of signaling messages and having associated therewith a first physical address, wherein said first physical address is compatible with the first common channel signaling system;

transmitting location data for the mobile station to a database associated with the mobile station, said location data transmitted using the first common channel signaling system;

storing the location data in the database;

receiving a request for current location information for the mobile station from an originating telecommunications node, said current location information requested for purposes of accessing the mobile station, wherein the originating telecommunications node uses a second common channel signaling system for transmission of signaling messages;

retrieving at least a portion of the stored location data in response to the request for current location information;

identifying a second physical address for the mobile telecommunications switching node, said second physical address compatible with the second common channel signaling system and incompatible with the first common channel signaling system;

transmitting the second physical address to the originating telecommunications node in response to the request for current location information; and routing an access request message to the serving mobile telecommunications switching node in accordance with the second physical address and using the second common channel signaling system, the access request message routed to the serving mobile telecommunications switching node for purposes of accessing the mobile station.

21. The method of claim 20, further comprising the step of converting said portion of the stored location data into the second physical address.

22. The method of claim 20, further comprising the steps of:

transmitting a plurality of physical addresses for the serving mobile telecommunications switching node, including the second physical address, to the originating telecommunications node in response to the request for current location information; and selecting the second physical address from the plurality of physical addresses for use in accessing the mobile station.

23. The method of claim 20, wherein the accessing of the mobile station comprises a setup of a call connection with the mobile station.

24. An international telecommunications system, comprising:

a register associated with a mobile station, said register storing information relating to a current location of the mobile station;

a foreign serving telecommunications node serving an area in which the mobile station is currently located, said serving telecommunications node notifying the register of a presence of the mobile station in the area by sending a location data message to the register using a first common channel signaling system, wherein said serving telecommunications node has associated therewith a first physical address compatible with the first common channel signaling system;

a domestic telecommunications node attempting to set-up a call connection with the mobile station, said domestic telecommunications node requesting from the register current location information for use in setting up the call connection with the mobile station and receiving a second physical address for the foreign serving telecommunications node, wherein said domestic telecommunications node routes a cellular protocol message to the foreign serving telecommunications node using a second common channel signaling system, said routing performed in accordance with the second physical address, the second physical address having a format incompatible with the first common channel signaling system; and wherein the register, responsive to a determination that the domestic telecommunications node uses the second common channel signaling system and that the second physical address has a format compatible with the second common channel signaling system, sends the second physical address to the domestic telecommunications node.

25. The system of claim 24, wherein the foreign serving telecommunications node routes a cellular protocol message to the domestic telecommunications node using the first common channel signaling system, said routing by the foreign serving telecommunications node performed in accordance with a third physical address, said third physical address associated with the domestic telecommunications node.

26. A method for providing short message service (SMS) addressing in a telecommunications system, comprising the steps of:

storing current location data for a mobile station;

receiving a request for a physical address for use in delivering an SMS message to the mobile station;

determining that the stored location data is incompatible with a common channel signaling system to be used for delivering the SMS message;

identifying, in response to the determination, a physical address corresponding to the current location data that is compatible with the common channel signaling system; and delivering the SMS message in accordance with the identified physical address using the common channel signaling system.

27. A method for providing an access to a mobile station in a telecommunications system, said telecommunications system including a plurality of networks that use different common channel signaling systems, comprising the steps of:

registering a mobile station with a serving mobile telecommunications switching node, said serving mobile telecommunications switching node using a first common channel signaling system for transmission of signaling messages;

transmitting location data for the mobile station to a database associated with the mobile station;

storing the location data in the database;

receiving a request for current location information for the mobile station from an originating telecommunications node, said current location information requested for purposes of accessing the mobile station, wherein the originating telecommunications node uses a second common channel signaling system for transmission of signaling messages, said second common channel signaling system incompatible with the first common channel signaling system, said request including a first physical address for the originating telecommunications node, said first physical address compatible with the second common channel signaling system;

retrieving at least a portion of the stored location data in response to the request for current location information;

transmitting the location data to the originating telecommunications node in response to the request for current location information, said location data transmitted using a second physical address for the originating telecommunications node, said second physical address compatible with the first common channel signaling system; and routing an access request message to the serving mobile telecommunications switching node in accordance with the location data, the access request message routed to the serving mobile telecommunications switching node for purposes of accessing the mobile station.

28. The method of claim 27, wherein said request further includes the second physical address for the originating telecommunications node.

29. The method of claim 27, further comprising the step of converting the first physical address for the originating telecommunications node to the second physical address for the originating telecommunications node, said step of converting performed in a network that uses the first common channel signaling system.

* * * * *